USO10202167B2

(12) United States Patent
Tomiuga

(10) Patent No.: US 10,202,167 B2
(45) Date of Patent: Feb. 12, 2019

(54) FRONT FORK

(71) Applicant: KYB Motorcycle Suspension Co., Ltd., Gifu (JP)

(72) Inventor: Takeshi Tomiuga, Gifu (JP)

(73) Assignee: KYB MOTORCYCLE SUSPENSION CO., LTD., Gifu (JP)

( * ) Notice: Subject to any disclaimer, the term of this patent is extended or adjusted under 35 U.S.C. 154(b) by 0 days.

(21) Appl. No.: 15/562,048

(22) PCT Filed: Apr. 6, 2016

(86) PCT No.: PCT/JP2016/061218
§ 371 (c)(1),
(2) Date: Sep. 27, 2017

(87) PCT Pub. No.: WO2016/170980
PCT Pub. Date: Oct. 27, 2016

(65) Prior Publication Data
US 2018/0105225 A1   Apr. 19, 2018

(30) Foreign Application Priority Data
Apr. 20, 2015   (JP) .................................. 2015-085729

(51) Int. Cl.
*B62K 25/08* (2006.01)
*F16F 9/342* (2006.01)
(Continued)

(52) U.S. Cl.
CPC ............... *B62K 25/08* (2013.01); *F16F 9/32* (2013.01); *F16F 9/342* (2013.01); *F16F 9/348* (2013.01); *F16F 9/44* (2013.01)

(58) Field of Classification Search
CPC ... B62K 25/08; F16F 9/32; F16F 9/342; F16F 9/348; F16F 9/19
(Continued)

(56) References Cited

U.S. PATENT DOCUMENTS 3,848,710 A * 11/1974 Thompson ................ F16F 9/42
137/516.11
4,964,625 A * 10/1990 Kawamura ............... F16F 9/49
188/284

(Continued)

FOREIGN PATENT DOCUMENTS

JP   2002-161937      6/2002
JP   2007-092820 A    4/2007
(Continued)

Primary Examiner — Joseph M Rocca
Assistant Examiner — Conan D Duda
(74) Attorney, Agent, or Firm — Paratus Law Group, PLLC

(57) ABSTRACT

A front fork is provided with a plurality of adjusters, while including a spring adjuster. In a front fork according to the means for solving the problem of the present invention, a spring adjuster is rotatably mounted on a position eccentric to a center of a cap as viewed in an axial direction and includes a screw portion disposed in an outer periphery protruded into a fork main body, and a plate in which the screw portion of the spring adjuster is screwed to change support positions of a suspension spring is brought into contact with a case (tubular member) at two points on both sides in a circumferential direction of the normal of the case that passes a mounting center of the spring adjuster. Accordingly, while being prevented from rotating, the plate can be downsized and can be disposed so as not to interfere with first and second adjusters.

5 Claims, 5 Drawing Sheets

(51) Int. Cl.
  *F16F 9/348* (2006.01)
  *F16F 9/44* (2006.01)
  *F16F 9/32* (2006.01)

(58) Field of Classification Search
  USPC ........................................................ 280/276
  See application file for complete search history.

(56) References Cited

U.S. PATENT DOCUMENTS

| | | | | |
|---|---|---|---|---|
| 5,301,973 A * | 4/1994 | Truchinski | ............. | B62K 25/06 267/177 |
| 5,598,904 A * | 2/1997 | Spyche, Jr. | ............... | F16F 9/34 188/287 |
| 6,767,024 B1 * | 7/2004 | Kuo | ........................ | B62K 25/08 188/285 |
| 7,131,755 B1 * | 11/2006 | Feng | ........................ | B62J 6/005 362/473 |
| 8,596,663 B2 * | 12/2013 | Shirai | ..................... | F16F 9/462 188/275 |
| 8,813,922 B2 * | 8/2014 | Mochizuki | ................ | F16F 9/34 188/313 |
| 9,534,652 B2 * | 1/2017 | Xu | ........................... | F16F 9/067 |
| 10,081,408 B2 * | 9/2018 | Yoshida | ................. | B62K 25/08 |
| 2003/0001358 A1 * | 1/2003 | Becker | .................. | B62K 25/08 280/276 |
| 2003/0001359 A1 * | 1/2003 | Miyabe | .................. | B62K 25/08 280/276 |
| 2004/0145101 A1 * | 7/2004 | Olds | ........................ | B62K 25/08 267/64.28 |
| 2004/0201145 A1 * | 10/2004 | Chen | ....................... | B62K 25/08 267/64.11 |
| 2004/0262879 A1 * | 12/2004 | Kinzler | .................. | B62K 21/20 280/276 |
| 2007/0074939 A1 * | 4/2007 | Chen | ....................... | B62K 25/08 188/297 |
| 2008/0116622 A1 * | 5/2008 | Fox | ........................ | B62K 25/08 267/64.28 |
| 2008/0230335 A1 * | 9/2008 | Furuya | .................. | B62K 25/08 188/315 |
| 2008/0258420 A1 * | 10/2008 | Fuse | ....................... | B62K 25/08 280/124.179 |
| 2009/0065316 A1 * | 3/2009 | Chen | ....................... | B62K 25/08 188/322.14 |
| 2009/0266656 A1 * | 10/2009 | Murakami | ............ | B60G 15/061 188/266.1 |
| 2010/0207350 A1 * | 8/2010 | Uchiyama | ............... | B62K 25/08 280/276 |
| 2010/0219569 A1 * | 9/2010 | Mori | ....................... | B62K 25/08 267/127 |
| 2010/0225081 A1 * | 9/2010 | Galasso | ................. | B62K 25/08 280/124.1 |
| 2010/0236882 A1 * | 9/2010 | Uchiyama | ............... | B62K 25/08 188/322.15 |
| 2010/0294605 A1 * | 11/2010 | Mochizuki | ............. | B62K 25/08 188/297 |
| 2012/0080865 A1 * | 4/2012 | Chen | ........................ | B62H 5/14 280/276 |
| 2012/0205843 A1 * | 8/2012 | Allen | .................... | B60G 15/12 267/64.25 |
| 2013/0093158 A1 * | 4/2013 | Schwindt | ............... | B62K 25/08 280/276 |
| 2013/0221634 A1 * | 8/2013 | Aoki | ...................... | B62K 25/08 280/276 |
| 2014/0124313 A1 * | 5/2014 | Ericksen | ................ | B62K 25/08 188/322.13 |
| 2014/0167380 A1 * | 6/2014 | Ogura | .................... | B62K 25/08 280/276 |
| 2014/0210146 A1 * | 7/2014 | Aoki | ...................... | B62K 25/08 267/64.11 |
| 2014/0252706 A1 * | 9/2014 | Kamioka | ............... | B62K 25/08 267/217 |
| 2014/0291090 A1 * | 10/2014 | Shimasaki | ................ | F16F 9/34 188/315 |
| 2015/0054253 A1 * | 2/2015 | Pye | ........................ | B62K 25/08 280/276 |
| 2015/0096852 A1 * | 4/2015 | Yoshida | ................. | B62K 25/08 188/297 |
| 2015/0096853 A1 * | 4/2015 | Yoshida | ................. | F16F 9/341 188/313 |
| 2015/0137478 A1 * | 5/2015 | Shirai | .................... | B62K 25/08 280/283 |
| 2016/0215846 A1 * | 7/2016 | Noguchi | ................ | B62K 25/08 |
| 2016/0290432 A1 * | 10/2016 | Barefoot | ............. | F16F 13/007 |

FOREIGN PATENT DOCUMENTS

| | | |
|---|---|---|
| JP | 2008-240838 | 10/2008 |
| JP | 2009-264411 A | 11/2009 |
| JP | 2011-058547 | 3/2011 |

* cited by examiner

FRONT FORK

CROSS REFERENCE TO PRIOR APPLICATION

This application is a National Stage Patent Application of PCT International Patent Application No. PCT/JP2016/061218 (filed on Apr. 6, 2016) under 35 U.S.C. § 371, which claims priority to Japanese Patent Application No. 2015-085729 (filed on Apr. 20, 2015), which are all hereby incorporated by reference in their entirety.

TECHNICAL FIELD

The present invention relates to a front fork.

BACKGROUND ART

An example of a front fork that supports a front wheel of a straddle-riding vehicle includes one that is interposed between a vehicle body and a front wheel axle in a straddle-riding vehicle, elastically supporting the vehicle body. Such a front fork typically includes a fork main body that is configured to extend/contract, provided with a vehicle body tube connected to the vehicle body of the straddle-riding vehicle and an axle tube fitted with the vehicle body tube and connected to the front wheel axle; and a suspension spring that is housed in the fork main body, configured to bias the fork main body in a direction of extension.

The front fork may be provided with a spring adjuster for axially moving a spring bearing that supports an upper end of the suspension spring so that vehicle heights can be adjusted. An example of a front fork including such a spring adjuster includes one that is provided with a damper cartridge inside a fork main body so as to change damping forces generated by the damper cartridge.

For example, a front fork disclosed in JP 2008-240838A is provided with a bypass passage, inside a damper cartridge, that is configured to bypass a damping force generating passage communicating two working chambers so as to communicate the two working chambers; and a needle valve that is configured to narrow down this bypass passage.

In such a front fork, a valve adjuster for adjusting a valve is provided to a cap that closes an end portion of a vehicle body tube, and an adjustment rod inserted into a piston rod by this valve adjuster and brought into contact with the needle valve is axially moved so as to adjust the damping forces.

On the other hand, a spring adjuster has a tubular shape, coaxially arranged in an outer periphery of the adjustment rod, and screwed in the cap so as not to obstruct the adjustment rod to adjust the damping forces. The spring adjuster is axially movable with respect to the cap when being rotated and is configured to displace a spring bearing that supports an upper end of a suspension spring brought into contact with a leading end and to change indicating positions of the suspension spring so that vehicle heights can be adjusted.

SUMMARY OF THE INVENTION

In a front fork configured in such a manner, each adjuster is mounted on a cap without difficulty, and vehicle heights and damping forces are adjusted without trouble. However, there is a demand to adjust damping forces both in the side of extension and in the side of compression, while leaving a function of vehicle height adjustment as it is.

However, conventionally, there is no front fork that is provided with a plurality of adjusters, such as an adjuster for adjusting damping forces in the side of extension and an adjuster for adjusting damping forces in the side of compression, in a cap disposed in a vehicle body tube, and also provided with a spring adjuster separately from the plurality of adjusters.

The present invention has been made to solve the above problem, and an object of the present invention is to provide a front fork provided with a plurality of adjusters, while including a spring adjuster.

In order to achieve the above object, in the front fork in the means for solving the problem of the present invention, the spring adjuster is rotatably mounted on a position eccentric to the center of a cap as viewed in an axial direction and includes a screw portion disposed in an outer periphery protruded into a fork main body, and a plate in which the screw portion of the spring adjuster is screwed to change support positions of a suspension spring is brought into contact with a tubular member at two points on both sides in a circumferential direction of the normal of the tubular member that passes through a mounting center of the spring adjuster.

DESCRIPTION OF EMBODIMENTS

Figure 1:
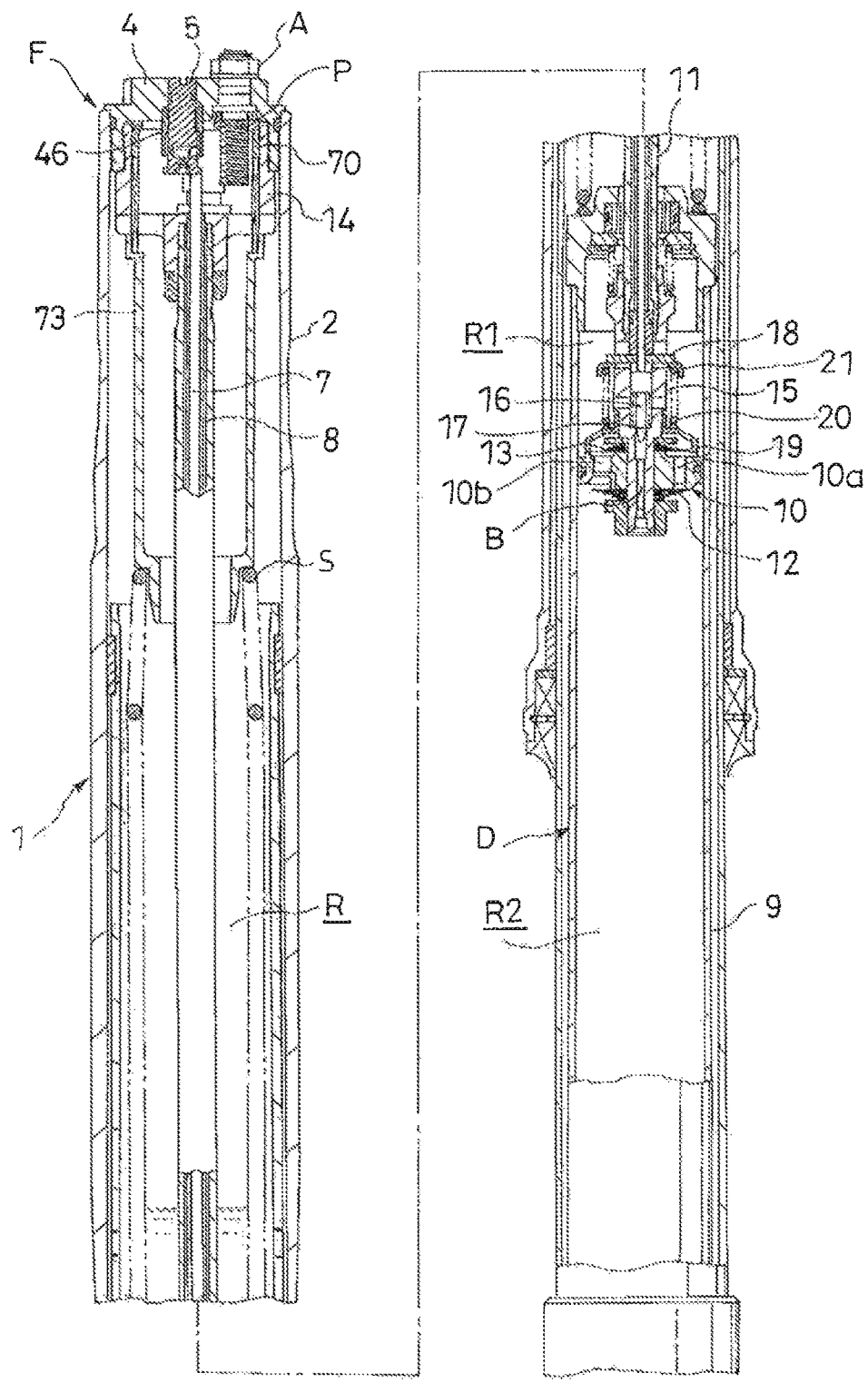
FIG. 1 is a longitudinal sectional view of a front fork according to an embodiment of the present invention.

The present invention will now be described based on an embodiment shown in the drawings. As shown in FIG. 1, a front fork F according to an embodiment of the present invention includes a fork main body 1 in which a vehicle body tube 2 and an axle tube 3 are slidably fitted; a suspension spring S housed in the fork main body 1, interposed between the vehicle body tube 2 and the axle tube 3; a cap 4 configured to close an end portion of the vehicle body tube 2; a spring adjuster A rotatably mounted on the cap 4; a plate P axially displaced with respect to the cap 4 by the rotation of the spring adjuster A so as to transmit this displacement to the suspension spring S; and an adapter 14 having a case 14a as a tubular member disposed in an outer periphery of the plate P.

The front fork F also includes first and second adjusters 5, 6 non-coaxially mounted on the cap 4, separated from the spring adjuster A; a first adjustment rod 7 housed in the vehicle body tube 2, disposed in the center of the vehicle body tube 2; and a second adjustment rod 8 housed in the vehicle body tube 2, disposed in an outer periphery of the first adjustment rod 7, and having a tubular shape.

Each part will be described below. The fork main body 1 is configured to be extendable/contractable by slidably inserting the axle tube 3 having a diameter smaller than that of the vehicle body tube 2 into the vehicle body tube 2, involving a bearing (not shown). It should be noted that the vehicle body tube 2 may be set to have a diameter smaller than that of the axle tube 3, and the vehicle body tube 2 may be inserted into the axle tube 3.

A damper cartridge D is housed in the fork main body 1, and this damper cartridge D extends/contracts in accordance with extension/contraction of the fork main body 1 so as to exert a damping force. The damper cartridge D includes a cylinder 9 fixed to a bottom cap (not shown) which closes a lower end opening of the axle tube 3; a piston 10 slidably inserted into the cylinder 9, partitioning the cylinder 9 into a chamber in the side of extension R1 filled with liquid and a chamber in the side of compression R2; and a piston rod 11 connected to the piston 10, slidably inserted into the cylinder 9, and connected to the cap 4 that closes an upper end opening of the vehicle body tube 2. Using a reservoir R filled with liquid and gas, an annular gap formed between the damper cartridge D and the fork main body 1 is communicated with the chamber in the side of compression R2 through holes (not shown) provided to this reservoir R and the cylinder 9. Accordingly, the liquid corresponding to a volume of the piston rod 11 that moves in and out of the cylinder 9 during extension/contraction is exchanged between the cylinder 9 and the reservoir R so as to supplement the volume. Operating oil can be used as the liquid. Furthermore, any other liquid is employable as long as it can exert a damping force.

The piston 10 has an annular shape, provided with a port in the side of extension 10a and a port in the side of compression 10b that allow the chamber in the side of extension R1 to communicate with the chamber in the side of compression R2. In a lower end of the piston 10 in FIG. 1, an annular leaf valve in the side of extension 12 that opens/closes the port in the side of extension 10a is laminated. In an upper end of the piston 10 in FIG. 1, an annular leaf valve in the side of compression 13 that opens/closes the port in the side of compression 10b is laminated. The piston 10, leaf valve in the side of extension 12, and leaf valve in the side of compression 13 are all mounted on an outer periphery of a piston connecting member 15 connected to a lower end of the piston rod 11 in FIG. 1. An inner periphery of the leaf valve in the side of extension 12 and that of the leaf valve in the side of compression 13 are fixed to the piston rod 11. An outer periphery of the leaf valve in the side of extension 12 and that of the leaf valve in the side of compression 13 are deflected away from the piston 10 and respectively open the port in the side of extension 10a and the port in the side of compression 10b.

The piston rod 11 has a tubular shape, and an upper end thereof in FIG. 1 is connected to the cap 4, involving the adapter 14 screwed in the cap 4. The lower end of piston rod 11 in FIG. 1 is mounted with the piston connecting member 15 that connects the piston 10 with the piston rod 11.

Figure 2:
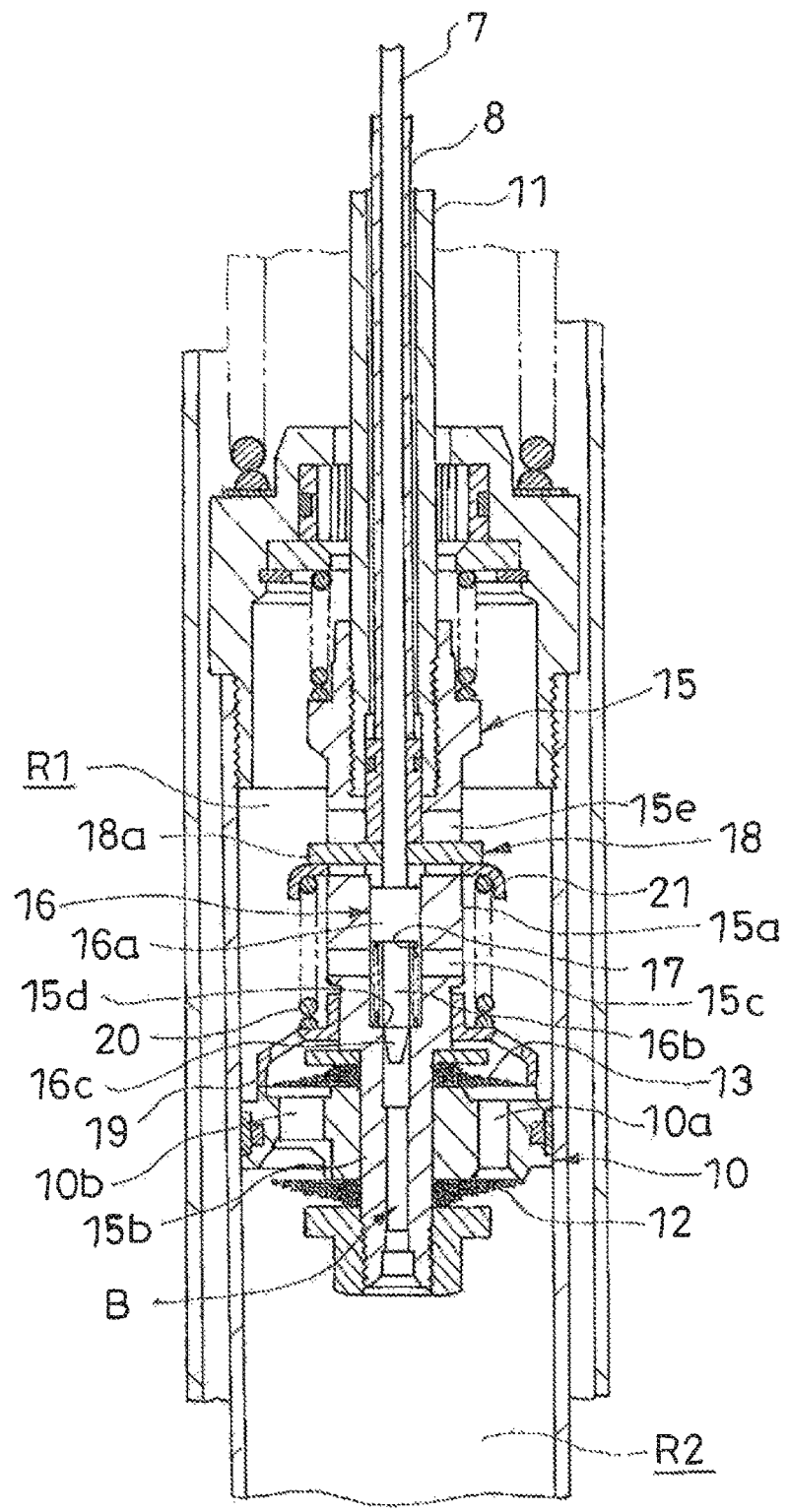
FIG. 2 is a partially enlarged longitudinal sectional view of a damper cartridge housed in the front fork according to the embodiment of the present invention.

As shown in FIG. 2, the piston connecting member 15 is formed in a tubular shape and includes a socket 15a having a tubular shape, screwed in an outer periphery of a leading end of the piston rod 11; a piston mounting shaft 15b having a tubular shape, extending downward in FIG. 2 from the socket 15a; a lateral hole 15c opening from a side of the socket 15a facing the chamber in the side of extension R1 so as to communicate with an inner part; an annular valve seat 15d provided to have a smaller inner diameter than the lateral hole 15c in a side closer to the chamber in the side of compression R2; and an elongated hole 15e axially provided to an upper part in FIG. 2 which is closer to the cap 4 than the lateral hole 15c of the socket 15a, allowing the inner part to communicate with an outer part.

The annular valve seat 15d is formed by providing a part that has a smaller inner diameter so as to form a stepped portion. However, the annular valve seat 15d may be formed by mounting a tubular or annular member inside the piston connecting member 15.

A lower end of the piston connecting member 15 faces the chamber in the side of compression R2 and the lateral hole 15c faces the chamber in the side of extension R1. Together with the lateral hole 15c, the lower end of the piston connecting member 15 forms a bypass passage B that is disposed inside the piston connecting member 15 and in a part closer to the chamber in the side of compression R2 than the lateral hole 15c, and is configured to bypass the port in the side of extension 10a and the port in the side of compression 10b so as to allow the chamber in the side of extension R1 to communicate with the chamber in the side of compression R2.

As shown in FIG. 2, the piston connecting member 15 houses a needle valve 16 that is axially movable and configured to be seated on or separated from the annular valve seat 15d. This needle valve 16 includes a base portion 16a slidably inserted into an inner periphery of the piston connecting member 15; a shaft portion 16b smaller in diameter than the base portion 16a, extending from the base portion 16a; and a valve body 16c provided to a leading end of the shaft portion 16b, configured to be seated on or separated from the annular valve seat 15d, and having a conical shape. A coil spring 17 is interposed between the base portion 16a and the stepped portion forming the annular valve seat 15d inside the piston connecting member 15, and the needle valve 16 is biased in a direction apart from the annular valve seat 15d.

An adjustment plate 18 having an annular shape is inserted inside the socket 15a of the piston connecting member 15 so as to be axially movable. This adjustment plate 18 is provided with an arm 18a that is inserted into the elongated hole 15e so as to extend outward. An outer periphery of the socket 15a is provided with a spring bearing 21 that has an annular shape and is axially movable. This spring bearing 21 is brought into contact with the arm 18a.

Furthermore, a slider 19 having an annular shape is slidably mounted on the outer periphery of the socket 15a of the piston connecting member 15. A lower end of the slider 19 in FIG. 2 is enlarged in diameter and is brought into contact with a surface, opposite to the piston, of an outer periphery of the leaf valve in the side of compression 13.

In the outer periphery of the socket 15a, a coil spring 20 serving as an adjustment spring is interposed in a compressed state between the slider 19 and the spring bearing 21. The leaf valve in the side of compression 13 is pushed toward the piston 10 by a biasing force of coil spring 20.

On the other hand, the second adjustment rod 8 having the tubular shape is inserted into the piston rod 11 so as to be axially movable, and this second adjustment rod 8 is inserted into the socket 15a of the piston connecting member 15 so as to push the adjustment plate 18 as shown in FIG. 2. Furthermore, the first adjustment rod 7 is inserted into the second adjustment rod 8 so as to be axially movable. As shown in FIG. 2, a lower end of the first adjustment rod 7 is bought into contact with an upper end of the needle valve 16 in FIG. 2 through the interior of the adjustment plate 18. As shown in FIG. 1, the first adjustment rod 7 is set to have an axial length longer than that of the second adjustment rod 8, and both ends of the first adjustment rod 7 are protruded outward from both ends of the second adjustment rod 8. An upper end of the first adjustment rod 7 and that of the second adjustment rod 8 in FIG. 1 are protruded outward from an upper end of the piston rod 11. The first and second adjustment rods 7, 8 are independently movable in the axial direction inside the piston rod 11.

Therefore, when the first adjustment rod 7 is pushed downward in FIG. 2 against a spring force of the coil spring 17, the valve body 16c of the needle valve 16 approaches the annular valve seat 15d. Conversely, when the first adjustment rod 7 is moved upward in FIG. 2, the needle valve 16 is pushed up by the coil spring 17, and the valve body 16c is separated from the annular valve seat 15d. In this manner, when the first adjustment rod 7 is moved upward or downward in FIG. 2, the needle valve 16 comes close to or draws apart from the annular valve seat 15d so that it is possible to adjust flow passage areas (degrees of valve opening) formed between the needle valve 16 and the annular valve seat 15d. It should be noted that what is provided to the bypass passage B is not limited to the needle valve 16 but may be a variable damping valve that is displaced inside the bypass passage B by the first adjustment rod 7 to vary flow passage areas or valve opening pressure.

When the second adjustment rod 8 is pushed downward in FIG. 2, the spring bearing 21 is pushed by the adjustment plate 18 and moves downward in FIG. 2 so as to compress the coil spring 20, which increases the biasing force of the coil spring 20 that pushes the leaf valve in the side of compression 13 toward the piston 10. Conversely, when the second adjustment rod 8 is moved upward in FIG. 2, the coil spring 20 pushes up the spring bearing 21 and the adjustment plate 18 so as to extend, which decreases the biasing force of the coil spring 20 that biases the leaf valve in the side of compression 13. In this manner, as the second adjustment rod 8 is moved upward or downward in FIG. 2, a degree of compression of the coil spring 20 and the biasing force change so that it is possible to adjust the valve opening pressure of the leaf valve in the side of compression 13.

In the front fork F configured as described above, extension of the fork main body 1 extends the damper cartridge D so that the chamber in the side of extension R1 is compressed by the piston 10. In a case where a speed of extension of the fork main body 1 is low and pressure of the chamber in the side of extension R1 is not sufficient enough to open the leaf valve in the side of extension 12, when the needle valve 16 is opened, the liquid inside the chamber in the side of extension R1 moves to the chamber in the side of compression R2 through the bypass passage B. Resistance offered by the needle valve 16 with respect to a flow of this liquid brings about a pressure difference between the chamber in the side of extension R1 and the chamber in the side of compression R2 so that the front fork F exerts a damping force for preventing the extending operation. In a case where the speed of extension of the fork main body 1 becomes high and the pressure of the chamber in the side of extension R1 becomes sufficient enough to open the leaf valve in the side of extension 12, when the needle valve 16 is opened, the liquid inside the chamber in the side of extension R1 moves to the chamber in the side of compression R2 through not only the bypass passage B but also the port in the side of extension 10a. Resistance offered by the needle valve 16 and the leaf valve in the side of extension 12 with respect to a flow of this liquid brings about a pressure difference between the chamber in the side of extension R1 and the chamber in the side of compression R2 so that the front fork F exerts a damping force for preventing the extending operation.

Herein, the degrees of valve opening of the needle valve 16 can be changed by moving the first adjustment rod 7 in the axial direction so that it is possible to adjust damping force characteristics in the side of extension of the front fork F (damping force characteristics with respect to a speed of extension/contraction).

Contraction of the fork main body 1 contracts the damper cartridge D so that the chamber in the side of compression R2 is compressed by the piston 10. In a case where a speed of contraction of the fork main body 1 is low and pressure of the chamber in the side of compression R2 does not reach the valve opening pressure of the leaf valve in the side of compression 13, when the needle valve 16 is opened, the liquid inside the chamber in the side of compression R2 moves to the chamber in the side of extension R1 through the bypass passage B. Resistance offered by the needle valve 16 with respect to a flow of this liquid brings about a pressure difference between the chamber in the side of compression R2 and the chamber in the side of extension R1 so that the front fork F exerts a damping force for preventing the contracting operation. In a case where the speed of contraction of the fork main body 1 becomes high and the pressure of the chamber in the side of compression R2 reaches the valve opening pressure of the leaf valve in the side of compression 13, when the needle valve 16 is opened, the liquid in the chamber in the side of compression R2 moves to the chamber in the side of extension R1 through not only the bypass passage B but also the port in the side of compression 10b. Resistance offered by the needle valve 16 and the leaf valve in the side of compression 13 with respect to a flow of this liquid brings about a pressure difference between the chamber in the side of compression R2 and the chamber in the side of extension R1 so that the front fork F exerts a damping force for preventing the contracting operation.

Herein, the valve opening pressure of the leaf valve in the side of compression 13 can be changed by moving the second adjustment rod 8 in the axial direction so as to change amounts of compression of the coil spring 20 so that it is possible to adjust damping force characteristics in the side of compression of the front fork F (damping force characteristics with respect to the speed of extension/contraction).

In this manner, in adjusting the displacement of the needle valve 16 by the first adjustment rod 7, it is possible to adjust the damping forces in the side of extension of the front fork F, and in adjusting the amounts of compression of the coil spring 20 of the second adjustment rod 8, it is possible to adjust the damping forces in the side of compression of the front fork F.

Figure 3:
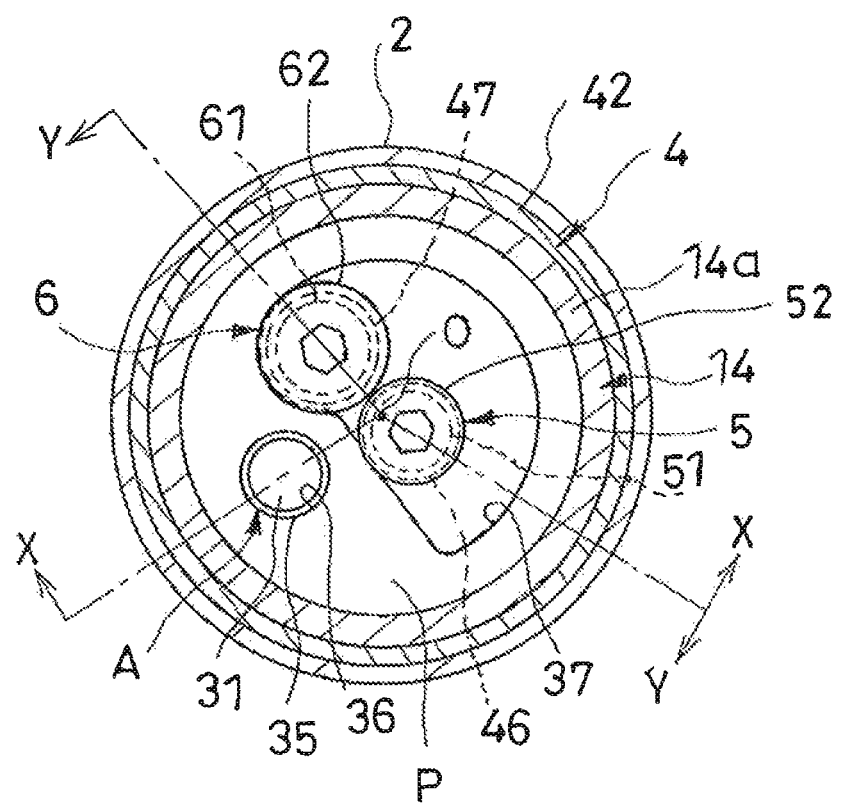
FIG. 3 is a plan view of a cap to which a spring adjuster is attached.
Figure 4:
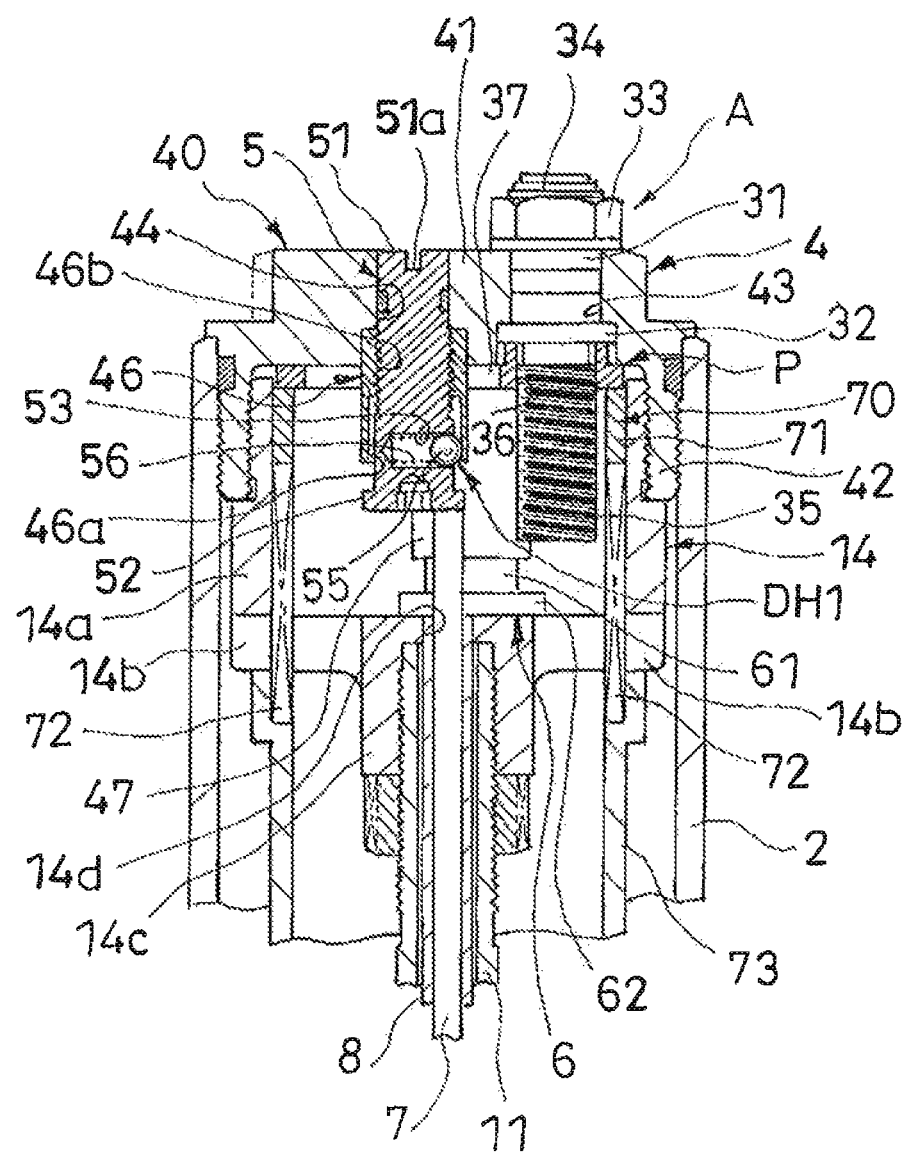
FIG. 4 is a cross sectional view, taken along the arrow XX, of the cap to which the spring adjuster is attached.

Subsequently, the spring adjuster A mounted on the cap 4 will be described in detail. As shown in FIGS. 3 and 4, in addition to the spring adjuster A, the first and second adjusters 5, 6 are mounted on the cap 4.

Figure 5:
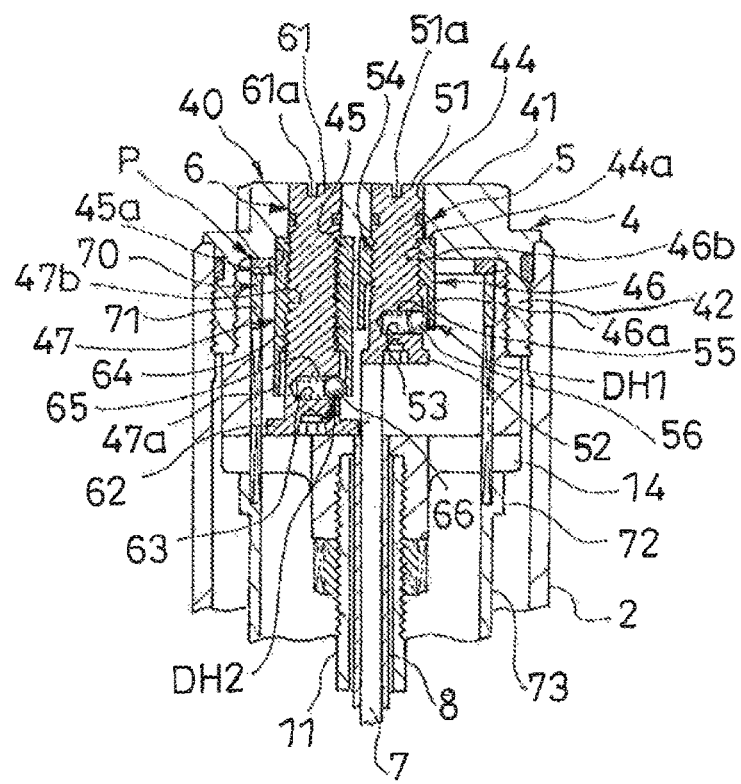
FIG. 5 is a view, taken along the YY arrow, of an end face of a cut section of the cap to which a first adjuster and a second adjuster are attached.

As shown in FIGS. 3 to 5, the cap 4 includes a cap body 40 that is provided with a lid portion 41 having a disk-like shape and a tubular screw portion 42 provided to a lower end of the lid portion 41 in FIG. 3, having a tubular shape, and screwed in an inner periphery of the end portion of the vehicle body tube 2; first, second, and third holes 43, 44, 45 which penetrate the lid portion 41 in the axial direction; a first adjuster case 46 mounted on the second hole 44; and a second adjuster case 47 mounted on the third hole 45. The adapter 14 is screwed in an inner periphery of the tubular screw portion 42, and the piston rod 11 is connected to the cap 4.

As shown in FIG. 3, the first hole 43 is provided at a position eccentric to a center O of the cap 4 as viewed in the axial direction of the cap 4; the second hole 44 is provided at a position that overlaps with the center of the cap 4; and the third hole 45 is provided at a position eccentric to the center O, separated from the first hole 43 and the second hole 44. The first, second, and third holes 43, 44, 45 are set to have a large diameter in the lower side and a small diameter in the upper side in FIGS. 4, 5 with respect to the lid portion 41.

As shown in FIG. 5, the first adjuster case 46 having a tubular shape is mounted on a large-diameter section 44a of the second hole 44 by press fitting; and the second adjuster case 47 having a tubular shape is mounted on a large-diameter section 45a of the third hole 45 by press fitting.

The first adjuster case 46 has the tubular shape, provided with a polygonal inner peripheral portion 46a having a polygonal cross sectional shape in the lower side in FIG. 5 of its inner periphery, and provided with a screw groove 46b in the upper side in FIG. 5 of the inner periphery. Similarly, the second adjuster case 47 has the tubular shape, provided with a polygonal inner peripheral portion 47a having a polygonal cross sectional shape in the lower side in FIG. 5 of its inner periphery, and provided with a screw groove 47b in the upper side in FIG. 5 of the inner periphery.

The spring adjuster A includes a spring adjuster body 31 having a columnar shape; a flange 32 provided in the middle of the spring adjuster body 31; an adjustment ring 33 mounted on an outer periphery of an upper end of the spring adjuster body 31 in FIG. 4, having a hexagonal outer shape; a ring 34 mounted on the outer periphery of the spring adjuster body 31 to prevent the adjustment ring 33 from falling off the spring adjuster body 31; and a screw portion 35 provided to an outer periphery of the spring adjuster body 31 lower in FIG. 4 than the flange 32. The spring adjuster A is inserted into the first hole 43 from the lower side in FIG. 4 of the cap 4. An inner periphery of the adjustment ring 33 is formed in a shape other than a circular shape, and an outer shape of a portion in the spring adjuster body 31 where the adjustment ring 33 is to be mounted is formed so as to correspond with the inner periphery of the adjustment ring 33. Therefore, when the spring adjuster body 31 is inserted into the adjustment ring 33, the adjustment ring 33 cannot rotate about the axis with respect to the spring adjuster body 31. Subsequently, when the adjustment ring 33 mounted on the outer periphery of the spring adjuster body 31 and protruded upward of the cap 4 is prevented from falling off by the ring 34, the cap 4 is sandwiched by the adjustment ring 33 and the flange 32 from both the upper and lower sides in FIG. 4, and the spring adjuster A is mounted so as to be rotatable about the axis with respect to the cap 4.

The first adjuster 5 includes a body 51 having a columnar shape; a first contact portion 52 provided to a lower end of the body 51 in FIG. 5, brought into contact with an end face closer to the cap or an upper end face of the first adjustment rod 7 in FIG. 5, and having a disk-like shape; a blind hole 53 opening from a side; and a screw portion 54 provided to an outer periphery of the body 51, screwed in the screw groove 46b of the first adjuster case 46.

The first adjuster 5 is inserted into the first adjuster case 46 mounted on the cap 4 by press fitting, and the screw portion 54 is screwed in the screw groove 46b so that the first adjuster 5 is mounted on the cap 4. An upper end of the body 51 in FIG. 5 is provided with a groove 51a for allowing a leading end of a flat-blade screwdriver to be inserted thereinto. Using the screwdriver, the first adjuster 5 can be rotated with respect to the cap 4.

The blind hole 53 houses a coil spring 55, and a ball 56 biased to be protruded from the blind hole 53 by the coil spring 55. When the first adjuster 5 is inserted into the first adjuster case 46 and the screw portion 54 is screwed in the screw groove 46b, the blind hole 53 opposes the polygonal inner peripheral portion 46a of the first adjuster case 46. Therefore, the ball 56 is constantly pushed by the coil spring 55 toward the polygonal inner peripheral portion 46a. When the ball 56 faces a corner of the polygonal inner peripheral portion 46a, the coil spring 55 extends to the maximum. In this state, when the first adjuster 5 is rotated with respect to the first adjuster case 46, the coil spring 55 is compressed and exerts a resistance force to obstruct the rotation of the first adjuster 5, trying to keep the ball 56 in the position facing the corner in an inner periphery of the polygonal inner peripheral portion 46a. Therefore, the first adjuster 5 is set to a position corresponding to the corner of the polygonal inner peripheral portion 46a in a circumferential direction with respect to the first adjuster case 46, and is positioned by the number of corners provided to the polygonal inner peripheral portion. For example, in a case where the polygonal inner peripheral portion 46a has a hexagonal cross sectional shape, the first adjuster 5 is positioned by six points. In this manner, a first detent mechanism DH1 that positions the first adjuster 5 in the circumferential direction is configured by the coil spring 55, ball 56, and first adjuster case 46. The detent mechanism herein is an example so that it may be configured by a structure other than this example.

The second adjuster 6 includes a body 61 having a columnar shape; a second contact portion 62 provided to a lower end of the body 61 in FIG. 5, brought into contact with an end face closer to the cap or an upper end face of the second adjustment rod 8 in FIG. 5, and having a disk-like shape; a blind hole 63 opening from a side; and a screw portion 64 provided to an outer periphery of the body 61, screwed in the screw groove 47b of the second adjuster case 47.

The second adjuster 6 is inserted into the second adjuster case 47 mounted on the cap 4 by press fitting, and the screw portion 64 is screwed in the screw groove 47b so that the second adjuster 6 is mounted on the cap 4. An upper end of the body 61 in FIG. 5 is provided with a groove 61a for allowing a leading end of a flat-blade screwdriver to be inserted thereinto. Using the screwdriver, the second adjuster 6 can be rotated with respect to the cap 4.

The blind hole 63 houses a coil spring 65, and a ball 66 biased to be protruded from the blind hole 63 by the coil spring 65. When the second adjuster 6 is inserted into the second adjuster case 47 and the screw portion 64 is screwed in the screw groove 47b, the blind hole 63 opposes the polygonal inner peripheral portion 47a of the second adjuster case 47. Therefore, the ball 66 is constantly pressed by the coil spring 65 toward the polygonal inner peripheral portion 47a. When the ball 66 faces a corner of the polygonal inner peripheral portion 47a, the coil spring 65 extends to the maximum. In this state, when the second adjuster 6 is rotated with respect to the second adjuster case 47, the coil spring 65 is compressed and exerts a resistance force to obstruct the rotation of the second adjuster 6, trying to keep the ball 66 in the position facing the corner in an inner periphery of the polygonal inner peripheral portion 47a. Therefore, the second adjuster 6 is set to a position corresponding to the corner of the polygonal inner peripheral portion 47a in the circumferential direction with respect to the second adjuster case 47, and is positioned by the number of corners provided to the polygonal inner peripheral portion. For example, in a case where the polygonal inner peripheral portion 47a has a hexagonal cross sectional shape, the second adjuster 6 is positioned by six positions. In this manner, a second detent mechanism DH2 that positions the second adjuster 6 in the circumferential direction is configured by the coil spring 65, ball 66, and second adjuster case 47. The detent mechanism herein is an example so that it may be configured by a structure other than this example.

When rotating the first adjuster 5 configured in such a manner, the first adjuster 5 is screwed in the first adjuster case 46 that is included in a part of the cap 4 and can be moved axially with respect to the cap 4 so that the first adjustment rod 7 in contact with the first contact portion 52 can be moved axially. Therefore, due to the rotation of the first adjuster 5 with respect to the cap 4, it is possible to change the degrees of valve opening of the needle valve 16 and to adjust the damping force characteristics in the side of extension of the front fork F (damping force characteristics with respect to the speed of extension/contraction).

On the other hand, when rotating the second adjuster 6, the second adjuster 6 is screwed in the second adjuster case 47 that is included in a part of the cap 4 and can be moved axially with respect to the cap 4 so that the second adjustment rod 8 in contact with the second contact portion 62 can be moved axially. Therefore, due to the rotation of the second adjuster 6 with respect to the cap 4, it is possible to change the amounts of compression of the coil spring 20 so as to change the valve opening pressure of the leaf valve in the side of compression 13, and to adjust the damping force characteristics in the side of compression of the front fork F (damping force characteristics with respect to the speed of extension/contraction).

As shown in FIGS. 3 to 5, the first contact portion 52 of the first adjuster 5 and the second contact portion 62 of the second adjuster 6 are disposed so as to be displaced from each other in the axial direction, and the first contact portion 52 of the first adjuster 5 is disposed so as not to interfere with the second adjuster case 47 of the second adjuster 6. Furthermore, the spring adjuster A, the body 51 of the first adjuster 5, and the body 61 of the second adjuster 6 are disposed in the cap 4 so as not to contact with each other. In other words, the first and second adjusters 5, 6 thoroughly do not interfere with each other. Still further, the spring adjuster A is disposed in the cap 4 so as not to overlap with the first contact portion 52 of the first adjuster 5 and the second contact portion 62 of the second adjuster 6 as viewed in the axial direction of the vehicle body tube 2 so that the spring adjuster A does not interfere with the first and second adjusters 5, 6. Therefore, the spring adjuster A does not obstruct the movement in the axial direction (a vertical direction in FIG. 5) of the first and second adjusters 5, 6 with respect to the cap 4, and the spring adjuster A can rotate about the axis with respect to the cap 4 without interference from the first and second adjusters 5, 6.

The adapter 14 includes the case 14a having a bottomed tubular shape, screwed in the inner periphery of the tubular screw portion 42 of the cap 4; a pair of notched holes 14b having a D-shape, penetrating the bottom of the case 14a; and a rod fastening portion 14c provided to the bottom of the case 14a, having a tubular shape. The pair of notched holes 14b is provided in such a manner that linear portions thereof are opposed to each other. The bottom of the case 14a has a rectangular shape with round corners as viewed in the axial direction. The case 14a houses the spring adjuster A, first adjuster 5, and second adjuster 6. Furthermore, an inner periphery of the rod fastening portion 14c is provided with a screw groove, and the interior of the rod fastening portion 14c is communicated with the interior of the case 14a through a hole 14d that penetrates the bottom of the case 14a. Accordingly, when the piston rod 11 is inserted and screwed in the rod fastening portion 14c, leading ends of the first and second adjustment rods 7, 8 can be protruded into the case 14a through the hole 14d.

Figure 6:
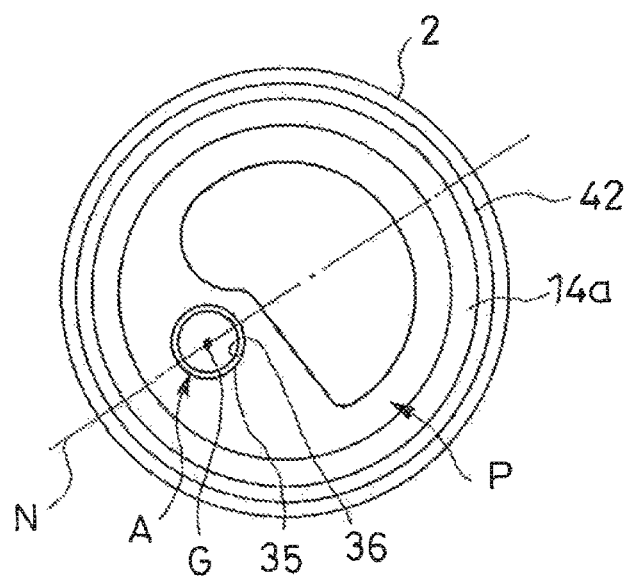
FIG. 6 is a plan view of the cap to which a plate is attached.

In this case, the plate P has a disk-like shape, and as shown in FIG. 6, the plate P includes a screw hole 36 provided at a position eccentric to the center as viewed in the axial direction, corresponding with the screw portion 35 of the spring adjuster A; and a notch 37 allowing the insertion of the first and second adjuster cases 46, 47. In order not to complicate the drawing, hatching in cross sections of the vehicle body tube 2, the case 14a which is the tubular member, and the tubular screw portion 42 in the cap 4 as well as denotation of the first and second adjusters 5, 6 are omitted in FIG. 6.

Furthermore, the outer periphery of the plate P is slidably brought into contact with an inner periphery of the case 14a of the adapter 14 which is the tubular member. Therefore, when the spring adjuster A is rotated, the plate P tries to rotate about a center G of the screw hole 36, which is a mounting center of the spring adjuster A. However, the center of rotation of the plate P is eccentric to the center of the adapter 14 concentrically mounted on the cap 4 so that the plate P is prevented from rotating by the case 14a which is the tubular member. Accordingly, when the spring adjuster A is rotated, the plate P moves in the axial direction within the case 14a in the manner of a feed screw. In this manner, the plate P is prevented from rotating so that the plate P does not interfere with the first adjuster 5 mounted on the first adjuster case 46 and the second adjuster 6 mounted on the second adjuster case 47. Thus, the plate P does not obstruct the movement in the axial direction (the vertical direction in FIG. 5) of the first and second adjusters 5, 6 with respect to the cap 4, and the plate P can move in the axial direction with respect to the cap 4.

In order to prevent the plate P from rotating in the inner periphery of the case 14a, as shown in FIG. 6, it is preferable that the plate P is brought into contact with the case 14a at two points circumferentially sandwiching the normal N of the inner periphery of the case 14a passing through the mounting center of the spring adjuster A in the plate P. In other words, the plate P is preferably brought into contact with the case 14a on both sides in the circumferential direction of this normal N with the normal N serving as the central line. Therefore, the shape of the plate P is not restricted to the disk-like shape, and may be a shape in which the plate P point contacts with the case 14a at two points sandwiching the normal N. The outer periphery of the plate P herein is provided with an arcuate surface which is slidably brought into contact with the inner periphery of the case 14a which is the tubular member. Therefore, when the plate P is prevented from rotating by the case 14a and moves in the axial direction, the plate P does not fret the inner periphery of the case 14a so that the plate P can move smoothly. Furthermore, as long as the plate P does not interfere with the first and second adjusters 5, 6, the plate P may have a shape in which a disk is notched from its outer periphery, that is, a fan shape so as to avoid the first and second adjusters 5, 6. In a case where the plate P is fan-shaped, the arcuate surface may be slidably brought into contact with the inner periphery of the case 14a, the tubular member, to prevent the rotation. Even in this case, the plate P can move smoothly in the axial direction.

The case 14a also houses a spring bearing member 70. The spring bearing member 70 includes an annular portion 71 which is in contact with the plate P; and two spring supporting portions 72 extending downward in FIG. 3 from the annular portion 71 and protruded outward from the adapter 14 through each of the pair of notched holes 14b of the adapter 14. A suspension spring bearing 73 having a tubular shape is provided below the spring supporting portions 72 of the spring bearing member 70. As shown in FIG. 1, the suspension spring S is interposed between the suspension spring bearing 73 and the cylinder 9 of the damper cartridge D. In other words, the suspension spring S is interposed between the vehicle body tube 2 and the axle tube 3, and constantly biases the front fork F in a direction of extension. Accordingly, as this front fork F is interposed between a front wheel and a vehicle body of a straddle-riding vehicle, the vehicle body can be elastically supported by the suspension spring S. It should be noted that an upper end in FIG. 1 of the suspension spring S may be directly supported by the spring supporting portions 72. The shape and the number of the notched holes 14b provided to the bottom of the case 14a of the adapter 14 may be arbitrarily determined within a range that does not cause insufficient strength of the bottom of the case 14a. The number of the spring supporting portions 72 may be arbitrarily determined as long as it is equivalent or less than the number of notched holes 14b. Since the spring supporting portions 72 are in contact with the suspension spring bearing 73 or the suspension spring S, it is preferable that the number of the spring supporting portions 72 is two or more in respect that the spring supporting portions 72 support the suspension spring bearing 73 or the suspension spring S.

When the spring adjuster A is rotated, the plate P is prevented from rotating by the case 14a serving as the tubular member and can move inside the adapter 14 in the vertical direction in FIG. 4 or in the axial direction. When the plate P is moved downward in FIG. 4, the spring bearing member 70 and the suspension spring bearing 73 also move downward in FIG. 4. Conversely, when the plate P is moved upward in FIG. 4, the suspension spring S pushes up the suspension spring bearing 73 and the spring bearing member 70 so that the suspension spring bearing 73 moves upward. In this manner, moving the plate P upward and downward in FIG. 4 by the spring adjuster A varies support positions where the suspension spring bearing 73 supports the upper end of the suspension spring S in FIG. 1. Therefore, with application of the front fork F to the straddle-riding vehicle, vehicle heights of the straddle-riding vehicle can be adjusted.

As described above, in the front fork F according to an embodiment of the present invention, the spring adjuster A is rotatably mounted on the position eccentric to the center O of the cap 4 as viewed in the axial direction and includes the screw portion 35 disposed in the outer periphery protruded into the fork main body 1, and the plate P in which the screw portion 35 of the spring adjuster A is screwed to change the support positions of the suspension spring S is brought into contact with the case (tubular member) 14a at two points on both sides in the circumferential direction of the normal N of the case 14a that passes through the mounting center of the spring adjuster A. Accordingly, even when the spring adjuster A is provided to the position eccentric to the center O with respect to the cap 4, the plate P screwed in the spring adjuster A can be prevented from rotating by the case 14a. With such a configuration, even when the first and second adjusters 5, 6 are provided to the cap 4, the plate P can be downsized so that the plate P can be disposed not to interfere with the first and second adjusters 5, 6.

Therefore, the front fork F according to an embodiment of the present invention can be provided with a plurality of adjusters 5, 6, while including the spring adjuster A. It should be noted that the number of adjusters other than the spring adjuster A is not restricted to the aforementioned number. Furthermore, the tubular member herein is represented by the case 14a of the adapter 14, but a part or the whole of the tubular screw portion 42 of the cap 4 may serve as the tubular member.

As the plate P includes the arcuate surface in contact with the inner periphery of the case 14a, the tubular member, even when the plate P is strongly pressed against the inner periphery of the case 14a by torque due to the rotation of the spring adjuster A, the plate P can smoothly move in the axial direction without damaging the inner periphery of the case 14a. It should be noted that the arcuate surface may be provided to the plate P in such a manner that an intersection point with the normal comes within a range where the arcuate surface is formed.

As described above, in the front fork F according to an embodiment of the present invention, the first and second adjusters 5, 6 are mounted so as to be axially movable with respect to the cap 4, and the plate P includes the notch 37 allowing the insertion of the first and second adjusters 5, 6. Therefore, even when each of the first and second adjusters 5, 6 moves in the axial direction with respect to the cap 4, the corresponding first and second adjustment rods 7, 8 can be moved independently without interference from the plate P. Furthermore, in the front fork F according to an embodiment of the present invention, the first and second adjusters 5, 6 are mounted so as to be axially movable with respect to the cap 4. Therefore, there is no need to provide a component that is prevented from rotating by the first and second adjusters 5, 6 and moves in the axial direction so as to make the first and second adjustment rods 7, 8 move, which greatly simplifies the structure of the first and second adjusters 5, 6.

When the first adjuster 5 in contact with the first adjustment rod 7 disposed in the center, as viewed in the axial direction of the vehicle body tube 2, is provided to a position overlapping with the center of the cap 4, as viewed in the axial direction of vehicle body tube 2, the first contact portion 52 can be decreased in diameter. Since the first contact portion 52 can be made small, arrangement of the second adjuster 6 can be freely designed in respect that the second adjuster 6 avoids interfering with the second contact portion 62, which enhances the degree of freedom in regard to designing. It should be noted that the first and second adjusters 5, 6 can be disposed in positions eccentric to the center, as viewed in the axial direction of the vehicle body tube 2, with respect to the cap 4, that is, in positions where the body 51 of the first adjuster 5 and the body 61 of the second adjuster 6 are deviated from the center O of the cap 4 as viewed in the axial direction.

In order to attach the first and second adjusters 5, 6 to the cap 4 so as to be axially movable, a structure other than screwing may be employed. For example, it is possible to employ a structure in which the first and second adjusters 5, 6 move forward and backward with respect to the cap 4 so that they can be positioned at a plurality of positions using the detent mechanism. However, as in the front fork F of the present embodiment, as the first and second adjusters 5, 6 are screwed in the cap 4 and configured to be axially movable with respect to the cap 4 by being rotated in the circumferential direction, it is possible to greatly simplify not only the structure to move axially but also the operation to move.

Furthermore, the adapter 14 for connecting the cap 4 and the piston rod 11 is configured to include the tubular member (case) 14a having the bottomed tubular shape and the notched holes 14b provided to the bottom portion, and the spring bearing member 70 that includes the spring supporting portions 72 protruded outward from the adapter 14 through the notched holes 14b of the adapter 14 and configured to support the suspension spring S is provided between the suspension spring S and the plate P. Therefore, it is possible to easily achieve the structure to change the support positions of the suspension spring S by the displacement of the plate P.

Still further, in a case where the plate P has a disk-like shape, the plate P can be in contact with the entire annular portion 71 of the spring bearing member 70 so that the spring bearing member 70 can move in the axial direction without tilting, which enables smooth adjustment of the vehicle heights.

Still further, there are the following advantages in a case where the cap 4 includes the cap body 40 having the second hole 44 into which the first adjuster 5 is inserted and the third hole 45 into which the second adjuster 6 is inserted; the first adjuster case 46 mounted on the second hole 44; and the second adjuster case 47 mounted on the third hole 45. Since the tubular first adjuster case 46 in which the first adjuster 5 is screwed and the tubular second adjuster case 47 in which the second adjuster 6 is screwed are formed separately from the cap body 40, it is possible to contain cost material. In a case where the first and second adjuster cases 46, 47 are formed in an integrated manner from the same base material as the cap body 40, it is necessary to increase a wall thickness of the lid portion 41 to secure an axial length of the first and second adjuster cases 46, 47. On the other hand, since the first and second adjuster cases 46, 47 herein are formed separately from the cap body 40, it is possible to make the lid portion 41 of the cap body 40 thin. Furthermore, as the polygonal inner peripheral portions 46a, 47a and the screw grooves 46b, 47b are provided to the tubular first and second adjuster cases 46, 47, processing is easier than a case where they are provided to the cap body 40 so that it is possible to reduce processing cost. Making the body 51 of the first adjuster 5 and the body 61 of the second adjuster 6 have the same outer diameter and making the first and second adjuster cases 46, 47 have the same shape, the first and second adjuster cases 46, 47 can be made as common parts so that it is possible to reduce manufacturing cost.

There is the following advantage in a case where the first detent mechanism DH1 that circumferentially positions the first adjuster 5 at a plurality of positions is provided between the first adjuster case 46 and the first adjuster 5 and in a case where the second detent mechanism DH2 that circumferentially positions the second adjuster 6 at a plurality of positions is provided between the second adjuster case 47 and the second adjuster 6. Since the first and second adjusters 5, 6 are positioned at the plurality of positions in the circumferential direction, when a user adjusts the damping force characteristics of the front fork F, it is possible for the user himself/herself to grasp what kind of damping force characteristics are set at points where the first and second adjusters 5, 6 are positioned.

Furthermore, the front fork F in the present embodiment includes the damper cartridge D housed in the fork main body 1. With the first adjustment rod 7 involved, the first adjuster 5 can change the flow passage areas of the variable damping valve (needle valve 16) of the damper cartridge D, and with the second adjustment rod 8 involved, the second adjuster 6 can change the spring forces of the coil spring 20 for biasing the leaf valve in the side of compression 13. Accordingly, it is possible to easily adjust the damping forces in the side of extension and in the side of compression of the front fork F by operating the first and second adjusters 5, 6.

The invention claimed is:

1. A front fork comprising:
    a fork main body in which a vehicle body tube and an axle tube are slidably fitted;
    a suspension spring housed in the fork main body and interposed between the vehicle body tube and the axle tube;
    a cap configured to close an end portion of the vehicle body tube;
    a spring adjuster rotatably mounted on a position eccentric to the center of the cap as viewed in an axial direction, having a screw portion disposed in an outer periphery and protruding into the fork main body;
    a plate in which the screw portion of the spring adjuster is screwed, configured to displace in the axial direction with respect to the cap by rotation of the spring adjuster so as to change support positions of the suspension spring; and
    a tubular member disposed on an outer periphery of the plate,
    wherein the plate is in contact with an inner periphery of the tubular member at two points on both sides in a circumferential direction of the normal of the tubular member that passes through at least a mounting center of the spring adjuster in the plate.

2. The front fork according to claim 1, wherein the plate has an arcuate surface contacting with the inner periphery of the tubular member.

3. The front fork according to claim 1, comprising:
    a damper cartridge housed in the fork main body, configured to include a cylinder connected to the axle tube and a piston rod inserted into the cylinder so as to be axially moveable; and
    an adapter configured to connect the piston rod to the cap,
    wherein the adapter includes the tubular member having a bottomed tubular shape connected to the cap and in contact with the plate, a notched hole provided to a bottom portion of the tubular member, and a rod fastening portion provided to the bottom portion and connected to the piston rod, and
    the front fork is provided with a spring bearing member, between the suspension spring and the plate, that has an annular portion in contact with the plate, and a spring supporting portion extending from the annular portion and protruding outward from the adapter through the notched hole of the adapter so as to support the suspension spring.

4. The front fork according to claim 1, comprising:
    a first adjuster and a second adjuster non-coaxially mounted on the cap, axially movable with respect to the cap;
    a first adjustment rod housed in the vehicle body tube, and disposed in the center of the vehicle body tube; and
    a second adjustment rod housed in the vehicle body tube, disposed in an outer periphery of the first adjustment rod, and having a tubular shape,
    wherein the first adjuster has a first contact portion in contact with an end face closer to the cap of the first adjustment rod, the second adjuster has a second contact portion in contact with an end face closer to the cap of the second adjustment rod, and the plate has a notch allowing insertion of the first adjuster and the second adjuster.

5. The front fork according to claim 4, wherein the plate is formed in a disk-like shape.

\* \* \* \* \*